United States Patent [19]

Newman

[11] 4,016,473
[45] Apr. 5, 1977

[54] DC POWERED CAPACITIVE PULSE CHARGE AND PULSE DISCHARGE BATTERY CHARGER

[75] Inventor: William Newman, Salt Lake City, Utah

[73] Assignee: Utah Research & Development Co., Inc., Salt Lake City, Utah

[22] Filed: Nov. 6, 1975

[21] Appl. No.: 629,285

[52] U.S. Cl. .................................. 320/14; 320/21; 320/35; 320/39
[51] Int. Cl.² .......................................... H02J 7/00
[58] Field of Search .............320/19, 20, 21, 35, 36 320/14, 39, 40, 22–24, DIG. 2

[56] References Cited
UNITED STATES PATENTS

| | | | |
|---|---|---|---|
| 3,614,581 | 10/1971 | Frost | 320/21 X |
| 3,629,681 | 12/1971 | Gurwicz | 320/21 |
| 3,775,659 | 11/1973 | Carlsen | 320/21 |

Primary Examiner—Robert J. Hickey
Attorney, Agent, or Firm—Trask & Britt

[57] ABSTRACT

A battery charger receives electrical power from an external source of direct current electrical power. The power is received through a first inductor which supplies it to a second node. First switching means receives the power from the second node and supplies it to a third node. A second inductor receives the power from the third node and supplies it to the battery to be charged through output connector means. Second switching means are connected to the second node and to a capacitor which is connected to the third node so that the second switching means can switch the capacitor between series circuit and parallel circuit configurations with respect to the first and second inductors. A safety circuit is connected to temperature sensing means positioned to sense the temperature of the battery to be charged, to the first node and to the first switching means. The safety circuit causes the first switching means to become nonconductive upon detection of unsafe conditions which may occur when charging. A control circuit is connected to the first node, to the second switching means, and to the output of the battery to be charged. The control circuit is also connected to the temperature sensing means and supplies control signals to the second switching means to repetitiously cause the capacitor to be first charged in parallel circuit through the first switching means and discharged in series circuit with said first and second inductors to pulse charge the battery to be charged and thereafter cause a brief pulse discharge of the battery to be charged with the repetition rate and magnitude of the pulses varying based on the state of charge of the battery to be charged.

10 Claims, 6 Drawing Figures

DC POWERED CAPACITIVE PULSE CHARGE AND PULSE DISCHARGE BATTERY CHARGER

BACKGROUND OF THE INVENTION

1. Field

This invention relates to battery chargers. More particularly, this invention provides a battery charger which receives direct current input power and pulse charges the battery to be charged, while simultaneously causing the battery to be charged to supply short discharge pulses.

2. State of the Art

Simple pulsing battery chargers are known. In operation, they impart repetitive pulses of current to a battery to bring it to and maintain it in a charged condition. Typically they receive an alternating current input and supply a direct current square wave output pulse to charge a battery.

Such pulse chargers have been found to not be adaptable for use with a direct current power source. Further, it has been found that square wave pulses are less than optimum in imparting power to and maintaining a battery fully charged.

It has also been discovered that conventional pulse chargers which are adapted for use with aircraft for charging typical 24 volt aircraft batteries can cause the battery to thermally run away. That is, the charger continues to charge a battery to a point where it overheats and eventually explodes, hazarding the aircraft and its occupants while in flight. Although a most pronounced hazard with respect to aircraft, thermal runaway is a known problem in other battery applications as well.

It may also be noted that pulse chargers in the art are capable of overcharging a battery and creating a hazard because they are not responsive to the temperature conditions of the battery being charged.

SUMMARY OF THE INVENTION

The battery charger of the instant invention includes power connector means for removable connection to an external source of direct current power. The power is received from the power connector through a first node which is conductively connected to a first inductor. The first inductor receives the electrical power and supplies it to a second node. The first switching means receives the electrical power from the second node and supplies it, when conductive, to a third node. A second inductor is conductively connected to the third node and supplies electrical power from the third node to the battery to be charged through output connector means removably connectable to the battery to be charged. Second switching means are conductively connected to the second node and to a capacitor which is connected to the third node. The second switching means switches the capacitor between a series circuit configuration and a parallel circuit configuration with respect to the first and second inductors. A control circuit is conductively connected to the first node, to the battery to be charged and to the second switching means. The control circuit generates control signals to cause the switching means to repetitiously switch the capacitor between the series and parallel configurations to charge the battery to be charged with pulses of electrical energy built up in the capacitor and inductors between pulses, and thereafter cause a brief pulse discharge of the battery to be charged. The repetition rate and magnitude of the charge and discharge pulses is varied in accordance with the state of charge of the battery to be charged as determined by the control circuit from the battery voltage signal received from the battery.

In one embodiment of the invention, the control circuit is connected to receive temperature reflective signals from temperature sensing means positioned to sense the temperature of the battery under charge. The control circuit operates the charger in a main mode and a topping mode. During main mode operation pulses of large magnitude are supplied to the battery until the battery voltage reaches a preselected voltage reflecting a nearly fully charged condition. Thereafter, the charger operates in the topping mode in which pulses of smaller magnitude are imparted to the battery for a period of time substantially the same as the period of time in which the charger operated in the main mode. At the end of the topping mode charging period, the battery charger stops charging until the battery voltage drops below the preselected battery voltage for termination of main mode operations. The preselected voltage is varied in accordance with the temperature of the battery.

In another embodiment, the first switching means has an input to receive a shutoff signal to cause it to attain and remain in a first state which is nonconductive. A safety circuit is conductively connected to receive the temperature reflective signal and to the second input of the first switching means to supply the shutoff signal upon receipt of the temperature reflective signal reflecting a preselected unsafe battery temperature.

In yet another embodiment of the invention, the safety circuit includes a shorted sensor detector circuit conductively connected to the temperature sensing means and to the second input of the first switching means to generate a shutoff signal upon detection of a temperature reflective signal that indicates the existence of an electrical short condition with respect to the temperature sensing means. The safety circuit may also include a high input detector circuit conductively connected to the second input of the first switching means and to the first node to detect high input-voltage and generate a shutoff signal upon detection thereof. The safety circuit may further include a cell-balanced detector circuit conductively connected to the battery to be charged, which has a plurality of cells, at the approximate electrical midpoint of the battery. The cell-balanced detector is conductively connected to the second input of the first switching means and generates a shutoff signal upon detection of the preselected electrical in unbalanced voltage condition between the cells of the battery.

In a preferred embodiment, the safety circuit includes a fault indicator circuit conductively connected to the high input detector circuit, high battery detector, shorted sensor detector and cell-balance detector to receive shutoff signals and generate and supply a fault signal to an external fault indicating circuit. The second switching means may also include a first semiconductor control rectifier (SCR) having an anode conductively connected to the second node, a cathode conductively connected to a fourth node, and a gate which is conductively connected to the control means to receive gate drive signals from the control means, and a second semiconductor control rectifier (SCR) having an anode conductively connected to the fourth node, a cathode connected to ground and a gate conductively connected to the control means to receive gate drive signals. The first SCR and the second SCR alternate between electrically conductive conditions and electrically nonconductive conditions in accordance with the gate drive signals to cause the capacitor to be switched between an electrically series and electrically parallel configuration with respect to the first and second conductors. The first switching means may also be a semiconductor control rectifier (SCR) having an anode connected to the second node and a cathode connected to the third node and a gate connected to the safety circuit to receive the shutoff signals.

BRIEF DESCRIPTION OF THE DRAWINGS

In the drawings, which illustrate the best mode presently contemplated for carrying out the invention.

DESCRIPTION OF THE ILLUSTRATED EMBODIMENT

Figure 1:
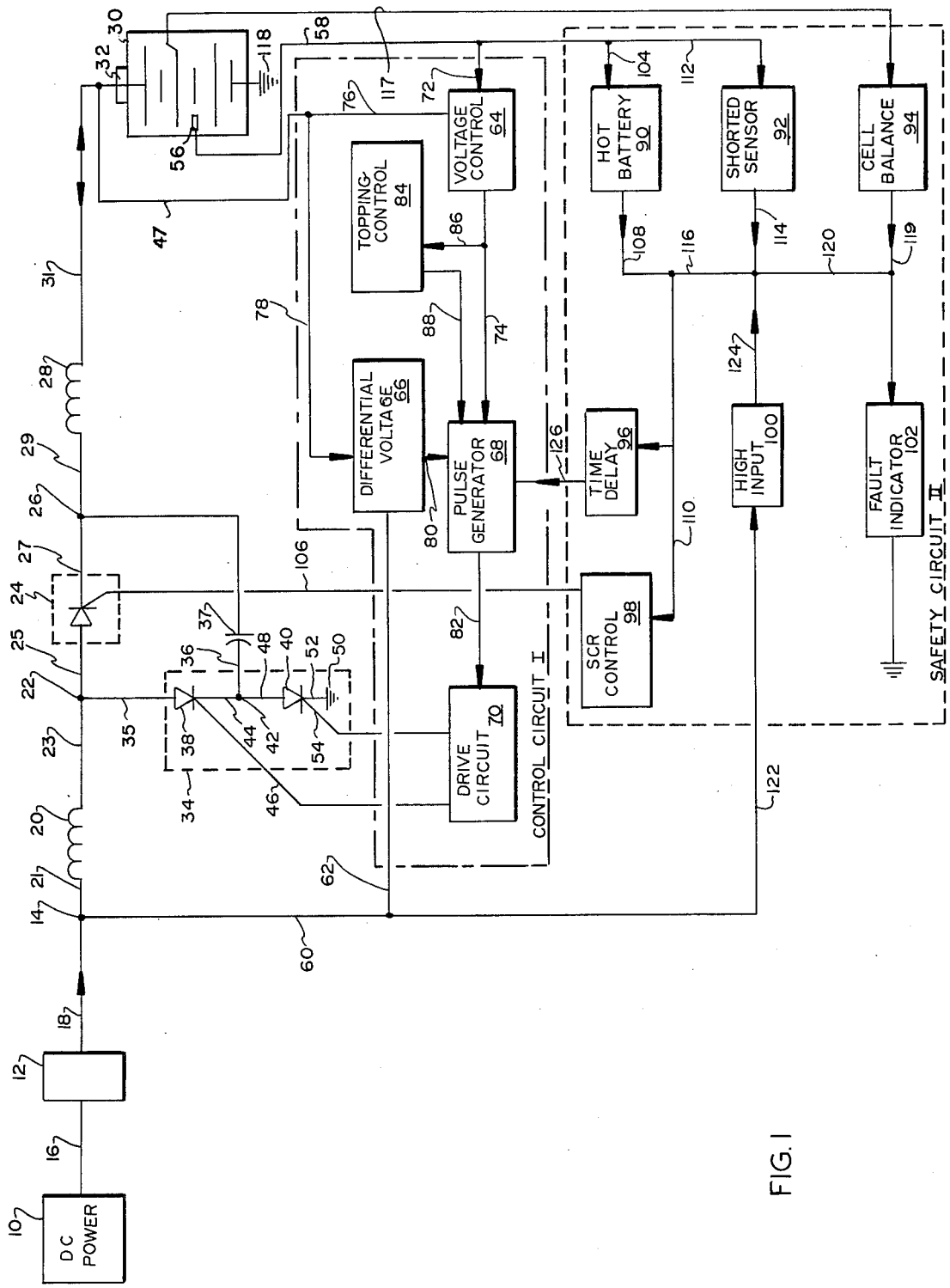
FIG. 1 is a simplified block diagram of the circuitry and components of the battery charger of the invention.

FIG. 1 is a simplified block diagram of the circuitry and components of a battery charger of the invention. As illustrated, an external source of direct current (DC) power 10 is conductively connected through power connector means 12 to a first node 14 via conductors 16 and 18. The external source of DC power 10 is a power supply of approximately 25 to 28.5 volts direct current (DC). Other power supplies may be available and can be adapted for use with dropping resistors and/or other circuitry known to those skilled in the art.

An inductor 20 has an input conductively connected to the first node 14 by conductor 21, and an output conductively connected to a second node 22 by conductor 23. Switching means 24 has an input conductively connected to the second node 22 by conductor 25, and an output conductively connected to a third node 26 by conductor 27. A second inductor 28 has an input conductively connected by conductor 29 to the third node 26 and has an output conductively connected to the battery to be charged 30 through conductor 31 and removable output connectors 32. The output connectors 32 may be any one of the different types for connection to batteries known to those skilled in the art.

Second switching means 34 is conductively connected by conductor 35 to the second node 22 and by conductor 36 to a capacitor 37 which is in turn conductively connected to the third node 26. The second switching means 34 may be any device capable of switching the capacitor 37 between a series configuration and a parallel configuration with respect to the first and second inductors 20, 28 as more fully discussed hereinafter.

As here illustrated, the switching means 34 is comprised of a first semiconductor controlled rectifier (SCR) 38 and a second SCR 40. The anode of the first SCR is connected to the second node 22 by conductor 35; and its cathode is connected to a fourth node 42 by conductor 44. The gate of SCR 38 is connected to Control Circuit I by conductor 46. The second SCR 40 has an anode which is connected to the forth node 42 by conductor 48, a cathode connected to ground 50 by conductor 52, and a gate connected to the Control Circuit I by conductor 54. The capacitor 37 is connected to the fourth node 42 of the switching means 34 by conductor 36. The first and second SCR's 38, 40 receive control signals which are gate-drive signals from the Control Circuit I via conductors 46 and 54 to cause them to change between conductive and nonconductive conditions. The gate drive signals are supplied alternatingly so that when the first SCR 38 is conductive, the second SCR 40 is nonconductive and vice versa. As a result, the capacitor 37 is switched, with respect to the inductors 20, 28, between: (1) a series circuit configuration from the first node 14 through inductor 20, second node 22, SCR 38, fourth node 42, capacitor 37, third node 26 and second inductor 28; and (2) a parallel circuit configuration from the first node 14 and first inductor 20 which is in series with the second inductor 28 through the second node 22, conductive switching means 24, and third node 26 with the capacitor 37 in parallel from the third node 26 through the fourth node 42 and second SCR 40 to ground 50.

Temperature sensing means 56 is positioned with respect to the battery 30 to sense the temperature of the battery 30. As illustrated, the temperature sensing means 56 is preferably positioned within the battery 30. The temperature sensing means 56 may be a temperature sensitive thermocouple, a temperature sensitive resistor, or a temperature sensitive thermal bulb connected to a variac as desired by the user. Preferably, the temperature sensing means 56 is a temperature sensitive resistor.

The temperature sensing means 56 is conductively connected to Control Circuit I via conductor 58. The Control Circuit I is also conductively connected to the first node 14 via conductors 60 and 62, to the output of the battery 30 via conductor 47, and to the second switching means 34 by conductors 46 and 54. The Control Circuit I may be any circuit capable of sending control signals to cause the second switching means 34 to operate as hereinbefore described and varying the rate of sending such control signals based on the state of charge of the battery 30 under charge as determined from a combined voltage and temperature input signal. As here illustrated, the Control Circuit I includes a voltage control circuit 64, a differential voltage detector 66, a pulse generator 68 and drive circuits 70.

The voltage control circuit 64 receives a temperature reflective signal from the temperature sensing means 56 via conductors 58 and 72. It also receives a battery voltage signal via conductors 47 and 76; and it supplies an output to the pulse generator 68 via conductor 74.

The differential voltage detector 66 receives power from external source 10 via conductors 60 and 62. It also receives a battery voltage signal from the output of the battery 30 via conductors 47 and 78. The detector 66 senses the difference in electrical voltage between the source 10 and battery 30 and generates an output which is supplied to the pulse generator 68 via conductor 80. The pulse generator 68 in turn supplies pulse signals to the drive circuit 70 via conductor 82. The drive circuit 70 receives the pulses and supplies gate drive signals to the first and second SCRs 38, 40 via conductors 46 and 54.

The Control Circuit I also includes a topping control circuit 84 which is conductively connected to the output of the voltage control circuit 64 by conductor 86 and to the pulse generator 68 by conductor 88.

In operation, the Control Circuit I allows for charging in two modes, viz: a main mode and a topping mode. The Circuit I automatically switches between the two modes based on the state of charge of the battery 30 as determined by its voltage and temperature.

To better understand the operation of the battery charger and its two modes of charging, it may be assumed that the charger is connected to a direct current source of electrical power at a voltage no less than the fully charged voltage of the battery to be charged. For a typical 24 volt nickel-cadmium type aircraft battery, the voltage of the power source should be from about 25 to 28.5 volts with its voltage preferably being 27.5 volts. When the battery is in a state of substantial discharge, the battery voltage of the battery is reduced from the battery voltage when the battery is fully charged. Since the differential voltage detector detects the voltage difference between the voltage of the input power and the battery voltage, it detects the increased difference when the battery voltage is reduced and supplies a signal to the pulse generator 68 related to the magnitude of the difference which causes the pulse generator 68 and in turn the charger to operate in the main mode.

In the main mode, the pulse generator 68 sends pulses to the drive circuit 70 and in turn the second switching means 70 to permit pulses to be imparted to the battery 30 which are of large magnitude. That is, a significant amount of electrical energy is supplied by each pulse. For a typical 24 volt nickel-cadmium type aircraft battery, the pulses supplied are about 10 amps average current over the duration of the charging pulse. As the battery 30 is charged and the battery voltage increases, the output signal of the differential voltage detector 66 causes the pulse generator 68 to pulse at a faster rate so that the total amount of electrical energy imparted per pulse diminishes.

When the battery voltage reaches a preselected value which is very close to the fully charged battery voltage of the battery 30, the charger automatically shifts to the topping mode. The automatic shift occurs because the output of the differential voltage detector 66 becomes insignificant; and the voltage control circuit 64 and topping control circuit 84 start generating an output to control the pulse generator 68. In the topping mode, the pulse generator 68 pulses at a slower rate as compared to the fastest pulses of the main mode. The pulses imparted to the battery 30 are also of lower electrical energy, the pulses being about two or three amps average over the duration of pulses of about the same duration and voltage. In the topping mode, the battery 30 is continued to be charged for a period of time substantially equal in length to the time the charger operated in the main mode. That is, the topping control circuit 84 contains a timer which times the length of main mode operation and causes topping mode operation for the same length of time. An E-cell 129 is shown in the topping control circuit of FIG. 2B which functions as such a timer.

Operation in the topping mode for a length of time equal to the time for main mode operation is preferred because it precludes excessive battery overcharging. The battery tends to not overheat avoiding thermal runaway conditions while ensuring that the battery is charged to a reasonably fully charged condition.

The voltage control circuit 64 operates to turn on the topping control circuit 84 and start the topping mode upon reaching the preselected battery voltage as detected by the voltage control circuit 64. The voltage control 64 receives the temperature reflective signal from sensing means 56 via conductors 58 and 72 so that it can vary the actual value of the preselected voltage in accordance with the temperature of the battery. That is, the internal impedance of the battery 30, and in turn the battery voltage reflecting the state of charge of the battery 30, will vary with temperature. In order to insure that the battery 30 is neither overcharged not undercharged, the voltage to cause the topping mode to start is thus varied with temperature.

It should be noted that as the battery voltage of the battery 30 falls below the preselected battery voltage as modified by battery temperature pulse charging will automatically restart in the main mode. It should also be noted that the pulses imparted in either the main mode or topping control mode are always followed by a short duration discharge pulse. Further, the preselected battery voltage is preferably selected so that upon its attainment the battery 30 will be nearly fully charged, viz: from about 85 percent to about 95 percent fully charged.

The charger of this invention preferably includes a safety circuit II to disenable the charger upon the occurrence of unsafe conditions. The safety circuit II as here illustrated, includes a hot battery detector circuit 90, a shorted sensor detector 92, a cell balance detector 94, a time delay circuit 96, a SCR control circuit 98, a high input detector 100 and a fault indicator circuit 102.

The hot battery detector circuit 90 is conductively connected to the temperature sensing means 56 by conductors 58 and 104. The detector circuit 90 receives a temperature reflective signal from the sensing means 56 and generates a shut-off signal when the temperature reflective signal reflects an unsafe temperature condition at the battery 30. The shut-off signal is supplied to the first switching means 24 to cause the first switching means 24 to change to and remain in a nonconductive condition. When the unsafe temperature condition clears, the shut-off signal is removed.

Preferably, the first switching means 24 is a semiconductor controlled rectifier (SCR) having an anode connected to the second node 22 by conductor 25, a cathode connected to the third node 26 by conductor 27, and a gate connected to the safety circuit II by conductor 106. The safety circuit II supplies the shut-off signal to the SCR 24 in the form of a gate drive signal that causes the SCR 24 to become nonconductive. The SCR control circuit 98 of the safety circuit II supplies the shut-off signal to the SCR 24 via conductor 106 and receives shut-off signals from the hot battery detector 90 via conductors 108 and 110.

The shorted sensor detector 92 is connected by conductors 58 and 112 to receive temperature reflective signals from the temperature sensing means 56. The sensor 92 detects the presence of a temperature reflective signal which is present when the temperature sensing means 56 is electrically shorted and therefore incapable of monitoring battery temperature. Upon the detection of a shorted sensor, the detector 92 supplies a charger shut-off signal to the SCR control 97 via conductors 114, 116 and 110. The SCR control 97 in turn causes the first switching means to become nonconductive.

The battery 30 under charge is typically a battery having multiple cells. It is known that individual cells of such a battery fail from time to time. In addition to the reduction of battery capacity upon such a failure, the failed cell presents a hazard during battery charging. Such a cell can overheat and boil, causing the battery itself to overheat and thermally run away, or otherwise damage the battery, its casing or the like. Detection of a shorted cell condition is therefore desirable.

The cell balance detector 94 of the safety circuit II is connected by conductor 117 to the electrical midpoint of the battery 30. That is, the battery 30, when a multiple cell battery, has an electrical midpoint or nearly so, where the number of cells between the midpoint and ground 118 and between the midpoint and the positive output 32 are equal if the total number of cells is an even integer, or within one if the total number of cells is an odd integer. If a cell fails, the electrical balance between the two halves is detected by the cell balance detector 94 from the voltage signals received via conductor 116. Upon such detection, the balance detector 94 supplies a shut-off signal to the SCR control 97 via conductors 119, 120, 116 and 110. The charger in turn is shut off as hereinbefore and hereinafter described.

The power supplied to the charger of this invention comes from an external source 10. The supplied power may vary and may on occasion pose a threat to the charger and the battery 30. That is, if the voltage of the input power becomes abnormally high, the circuitry of the charger may be damaged and/or the battery 30 may be damaged. The high input detector 100 monitors the input power voltage via conductors 60 and 122, and generates a shut-off signal which is supplied to the SCR control 98 via conductors 124, 116 and 110 upon the occurrence of preselected high unsafe input voltage.

In the safety circuit II illustrated, all the shut-off signals supplied to the SCR control 98 are also supplied to a time delay circuit 96. The time delay circuit 96 is connected to the pulse generator 68 by conductor 126 and supplies a signal to the pulse generator 68 to cause it to stop pulsing and stop in the condition where the drive circuits place the first SCR 38 and the second SCR 40 in nonconductive conditions. The time delay circuit inserts a time delay between receipt of a shut-off signal and a generation of a stop pulsing signal to the pulse generator 68 to allow the pulse generator 68 to pulse at least once to allow the inductors 20, 28 and capacitor 37 to release their stored electrical energy.

The fault indicating circuit 102 also receives shut off signals. It supplies them to external means for fault indication (e.g., an audio and/or visual alarm). The fault indicating circuit 102 is optional and provided for the convenience of the user.

Figure 2A:
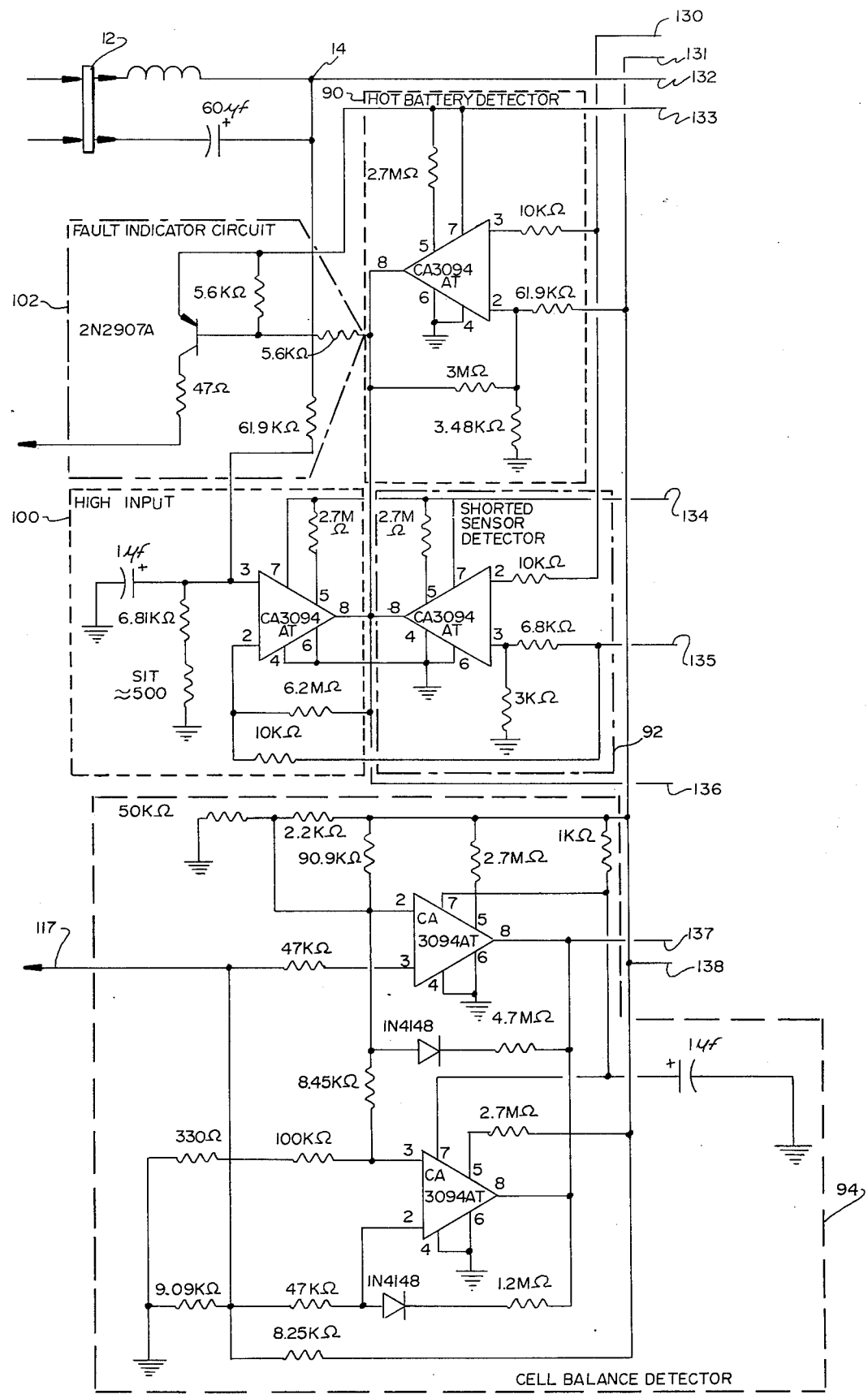
FIGS. 2A and 2B are circuit diagrams which together illustrate the circuitry of a battery charger of the invention.
Figure 2B:
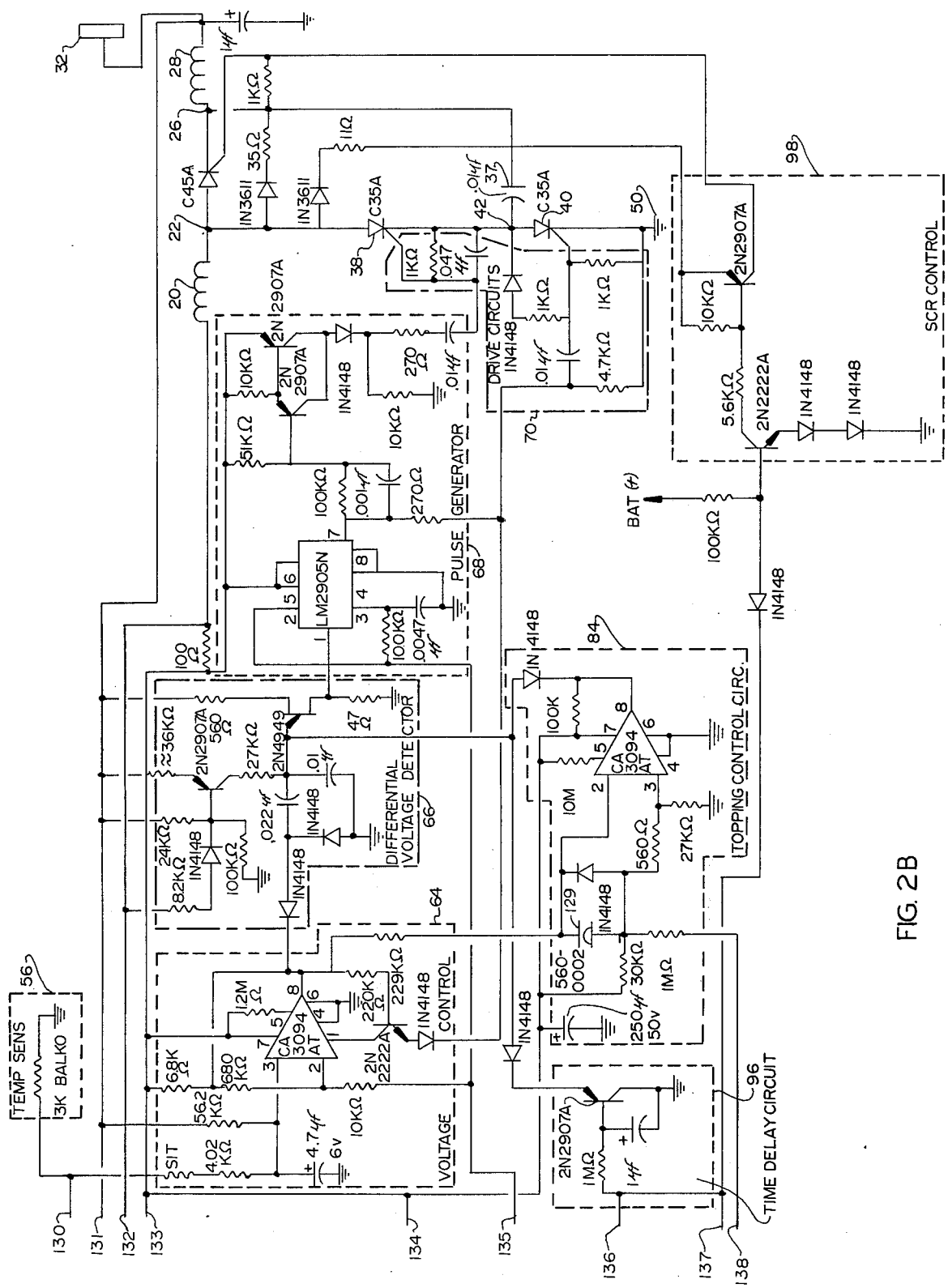
Figure 4:
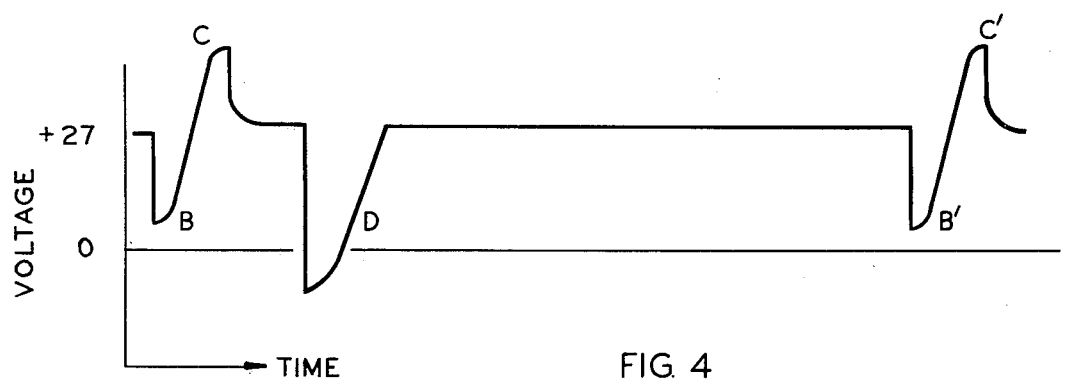

Referring now to FIGS. 2A and 2B, practical circuitry of the embodiment of FIG. 4 is illustrated. The circuits of FIGS. 2A and 2B are interconnected by common conductors 130, 131, 132, 133, 134, 135, 136, 137 and 138. Preferred circuit component values and component selection are shown which those skilled in the art will recognize can be varied or changed without substantially affecting the principles of operation of circuits illustrated.

Figure 3:
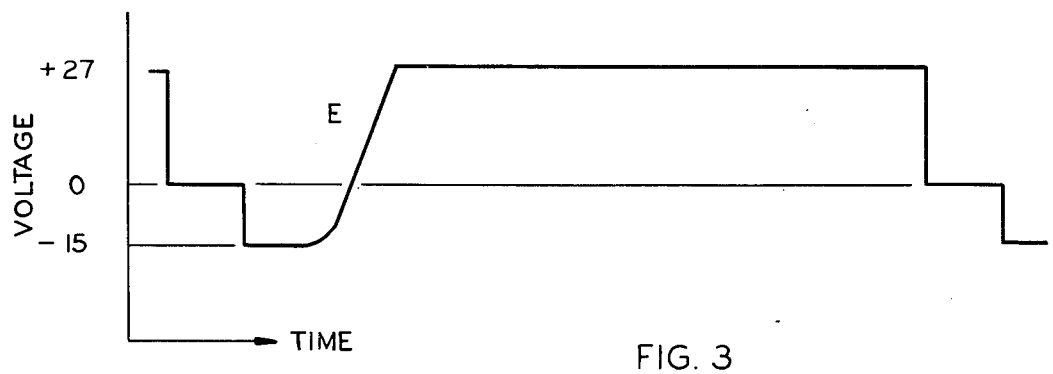
FIGS. 3, 4 and 5 are graphs depicting signals present at selected points of the embodiment of the invention illustrated in FIG. 2.
Figure 5:
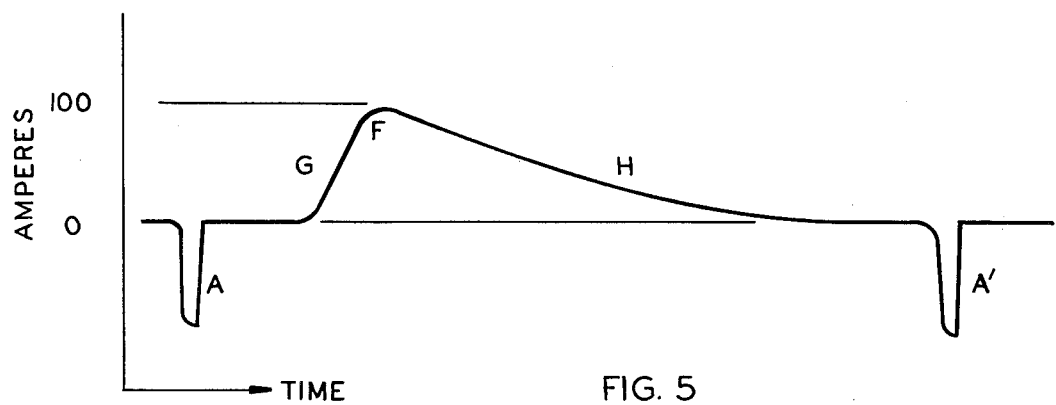

FIGS. 3, 4 and 5 illustrate the signals occurring at selected points in the circuits to better understand their operation. FIG. 3 illustrates the signal present at the fourth node 42 of FIGS. 1 and 2. FIG. 4 illustrates the signal present at the second node 22 of FIGS. 1 and 2. FIG. 5 illustrates the battery current signal present at the battery connector 32 of FIGS. 1 and 2.

With the charger of the invention in operation and connected to a direct current source of power delivering power at 25 to 28.5 volts DC, a discharge pulse A (FIG. 5) is extracted from the battery under charge 30. In turn, the voltage at the second node 22 drops rapidly toward zero (Signal B, FIG. 4) volts and then rapidly climbs past its nominal 27 volts (Signal C, FIG. 4) as the capacitor 37 is switched into parallel and charged. When the capacitor 37 is charged and switched into series circuit with inductors 20 and 28, the voltage at the second node drops below zero volts and climbs rapidly to nominal input voltage of 27 volts (Signal D, FIG. 4). At the same time, the voltage at the forth node 42 climbs from a negative to nominal input voltage of 27 volts DC (Signal E, FIG. 3); and the battery is charged with a pulse of current (Signal F, FIG. 5) which is a distorted sine wave having a rapidly ascending leading edge (Signal G, FIG. 5) and a slowly diminishing trailing edge (Signal H, FIG. 5).

The distored sine wave (Signals F, G and H) is preferred because it has been found that batteries generally accept the charge more efficiently than with other forms of signals. In particular, batteries of the 24 volt nickel-cadmium type typically used in aircraft accept the distorted sine wave with less overheating and less internal losses.

It is to be understood that the embodiments of the invention above-described are merely illustrative of the application of the principles of the invention. Reference herein to details of the illustrated embodiment is not intended to limit the scope of the claims which themselves recite those features regarded as essential to the invention.

I claim:

1. A battery charger comprising:
    power connector means for removable conductive connection to an external source of direct current power;
    a first node conductively connected to said power connector to receive and transmit electrical energy;
    a first inductor to receive, store and transmit received and stored electrical energy having an input conductively connected to said first node and an output;
    a second node conductively connected to said output of said first inductor to receive and transmit electrical energy;
    first switching means having an output and an input which is conductively connected to said second node, and having a first state in which said switching means is conductive to receive and transmit electrical energy received from said second node and a second state in which said switching means is nonconductive to not transmit electrical energy, said switching means automatically switching between said first state and said second state in accordance with preselected electrical signals sensed by said switching means;
    a third node conductively connected to said output of said first switching means to receive and transmit electrical energy;
    a second inductor to receive, store and transmit received and stored electrical energy having an input conductively connected to said third node and having an output;

output connector means conductively connected to said output of said second inductor which is removably conductively connectable to a battery to be charged to receive and transmit electrical energy;

a capacitor conductively connected to said third node to receive, store and transmit electrical energy;

second switching means conductively connected to said capacitor and to said second node to switch said capacitor between a series circuit and parallel circuit configuration with respect to said first and second inductors;

temperature sensing means positioned to sense the temperature of the battery to be charged and generate an electrical signal reflective of said temperature;

control means conductively connected to said first node to receive electrical energy therefrom, to said temperature sensing means to receive said temperature reflective electrical signal therefrom, to said battery to receive an electrical signal reflective of the voltage across said battery, and to said second switching means to supply control signals thereto, said control means generating said control signals to repetitiously cause said capacitor to be first charged in parallel circuit through said first switching means and discharged in series with said first and second inductors to pulse charge said battery to be charged and thereafter cause a brief pulse discharge of said battery, the repetition rate of said charge and discharge pulses varying based on the state of charge of the battery to be charged as determined by said control means from the battery voltage signal and temperature reflective signal.

2. The battery charger of claim 1 wherein said first switching means has a second input to receive a shutoff signal to cause said switching means to attain and remain in said first state and wherein said battery charger further comprises a safety circuit conductively connected to said temperature sensing means to receive said temperature reflective electrical signal and to said second input of said first switching means to supply said shutoff signal, said safety circuit including a hot battery detection circuit to generate and supply said shutoff signal upon receipt of said temperature reflective signal reflecting a preselected unsafe battery temperature.

3. The battery charger of claim 2 wherein said safety circuit includes a shorted sensor detector circuit conductively connected to said temperature sensing means and to said second input of said first switching means to receive said temperature reflective electrical signals and generate said shutoff signal upon detection of temperature reflective electrical signals that indicate the existence of an electrical short condition with respect to said temperature sensing means.

4. The battery charger of claim 3 wherein said safety circuit includes a high input detector circuit conductively connected to said second input of said switching means and to said first node to receive input power signals and generate a said shutoff signal upon detection of a preselected high input power level.

5. The battery charger of claim 4 wherein said battery under charge has a plurality of cells and wherein said safety circuit includes a cell balance detector conductively connected to said second input of said first switching means and to substantially the electrical voltage midpoint of said battery to receive electrical signals therefrom and generate a said shutoff signal upon detection of a preselected electrical voltage imbalance between cells of said battery.

6. The battery charger of claim 5 wherein said safety circuit includes a fault indicator circuit conductively connected to said high input detector, hot battery detector, shorted sensor detector and cell balance detector to receive shutoff signals therefrom and generate and supply a fault signal to an external circuit.

7. The battery charger of claim 5 wherein said second switching means comprises:

a first semiconductor controlled rectifier (SCR) having an anode conductively connected to said second node, a cathode conductively connected to a fourth node and a gate conductively connected to said control means to receive a gate drive signal from said control means to change said first SCR between a first condition in which said first SCR is electrically conductive and a second condition in which said first SCR is electrically nonconductive;

a second semiconductor controlled rectifier (SCR) having an anode conductively connected to said fourth node, a cathode conductively connected to electrical ground and a gate conductively connected to said control means to receive a gate drive signal from said control means to change said second SCR between a first condition in which said second SCR is conductive and a second condition in which said second SCR is nonconductive; and wherein said capacitor is conductively connected to said fourth node, and wherein said control means supplies said gate drive signals to said first and second SCRs so that said capacitor is switched between said series and parallel configuration.

8. The battery charger of claim 7 wherein said control means include:

a drive circuit conductively connected to said gates of said first and second SCRs to supply said gate drive signals;

a pulse generator conductively connected to said drive circuit to supply enabling signals thereto;

a differential voltage detector conductively connected to said first node and to said battery to be charged to detect the difference in electrical voltage therebetween and to said pulse generator to supply a differential voltage signal;

a voltage control circuit conductively connected to said battery to be charged to receive a battery voltage signal to said temperature sensing means to receive a temperature reflective signal, and to said pulse generator to supply a voltage control signal to said pulse generator reflective of the state of charge of said battery to be charged; and wherein said pulse generator receives said voltage differential signals and said voltage control signals and generates said enabling signals so that said first and second SCRs operate to electrically pulse charge and pulse discharge said battery to be charged in accordance with a preselected charge program.

9. The battery charger of claim 8 wherein said first switching means is a third semiconductor controlled rectifier having an anode conductively connected to said second node, a cathode conductively connected to said third node and a gate conductively connectively connected to said safety circuit to receive said shutoff signals therefrom to change said third SCR between a first electrically nonconductive and a second conductive condition.

10. The battery charger of claim 9 wherein said control means includes a topping control circuit conductively connected to the output of said voltage control circuit and to said pulse generator to control said pulse generator and in turn said battery charger in electrical cooperative combination with said voltage control circuit to cause said pulse generator and in turn said charger to pulse in a topping mode which commences when the battery voltage of said battery reaches a preselected battery voltage reflecting a nearly fully charged battery and terminates after a period of time substantially equal in length to the period of time said charger operated in a main mode, wherein said differential voltage detector causes said pulse generator and in turn said charger to pulse in a main mode at voltages less than said preselected battery voltage, said pulses in said main mode which are of large electrical magnitude being imparted at a faster pulse rate as the battery voltage increases to said preselected voltage and said pulses in said topping mode which are of smaller electrical magnitude as compared to the pulses in said main mode being imparted at a slower pulse rate as compared to the fastest pulse rate in said main mode, and said preselected voltage and preselected maximum voltage varying with the temperature of the battery.

\* \* \* \* \*

UNITED STATES PATENT AND TRADEMARK OFFICE
CERTIFICATE OF CORRECTION

PATENT NO. : 4,016,473
DATED : April 5, 1977
INVENTOR(S) : William Newman

It is certified that error appears in the above-identified patent and that said Letters Patent are hereby corrected as shown below:

Column 4, second line, change "forth" to ---fourth---;

Column 6, thirteenth line, change "not" to ---nor---;

Column 8, fifteenth line, change "forth" to ---fourth---;

Column 8, twenty-second line, change "distored" to ---distorted--

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*